United States Patent
Pan et al.

(10) Patent No.: US 10,311,493 B2
(45) Date of Patent: Jun. 4, 2019

(54) MANAGING COMMERCE-RELATED COMMUNICATIONS WITHIN A SOCIAL NETWORKING SYSTEM

(71) Applicant: Facebook, Inc., Menlo Park, CA (US)

(72) Inventors: Bowen Pan, Palo Alto, CA (US); Derek Chirk Yin Cheng, Issaquah, WA (US); Oliver Shijie Zheng, Seattle, WA (US)

(73) Assignee: FACEBOOK, INC., Menlo Park, CA (US)

( * ) Notice: Subject to any disclaimer, the term of this patent is extended or adjusted under 35 U.S.C. 154(b) by 6 days.

(21) Appl. No.: 14/854,695

(22) Filed: Sep. 15, 2015

(65) Prior Publication Data

US 2017/0076345 A1    Mar. 16, 2017

(51) Int. Cl.
*G06Q 30/00* (2012.01)
*G06Q 30/06* (2012.01)
*H04L 29/08* (2006.01)

(52) U.S. Cl.
CPC ..... *G06Q 30/0617* (2013.01); *G06Q 30/0625* (2013.01); *G06Q 30/0641* (2013.01); *H04L 67/12* (2013.01); *H04L 67/22* (2013.01); *H04L 67/306* (2013.01)

(58) Field of Classification Search
CPC ................ G06Q 30/0617; G06Q 30/0641
USPC ....................................... 705/26.43
See application file for complete search history.

(56) References Cited

U.S. PATENT DOCUMENTS

| | | | | |
|---|---|---|---|---|
| 9,020,824 | B1* | 4/2015 | Govil | G10L 19/04 704/270 |
| 2012/0136866 | A1* | 5/2012 | Carter | G06Q 50/01 707/740 |
| 2012/0254764 | A1* | 10/2012 | Ayloo | G06Q 50/01 715/738 |
| 2013/0282839 | A1* | 10/2013 | Alcala | H04N 21/4788 709/206 |
| 2013/0318180 | A1* | 11/2013 | Amin | H04L 65/403 709/206 |
| 2015/0006301 | A1* | 1/2015 | McMillion | G06Q 30/0277 705/14.73 |
| 2015/0088650 | A1* | 3/2015 | Taylor | G06F 17/30684 705/14.54 |
| 2015/0106304 | A1* | 4/2015 | Gupta | G06N 5/04 706/11 |

* cited by examiner

Primary Examiner — Yogesh C Garg
Assistant Examiner — Lalith M Duraisamygurusamy
(74) Attorney, Agent, or Firm — Keller Jolley Preece

(57) ABSTRACT

The present disclosure is directed toward systems and methods for managing commerce-related communications within a social networking system. For example, systems and methods described herein can identify a particular social networking system post and can generate an optimized version of that particular post. In one or more embodiments, systems and methods described herein can also identify additional social networking system posts that are related to the particular social networking system post.

20 Claims, 9 Drawing Sheets

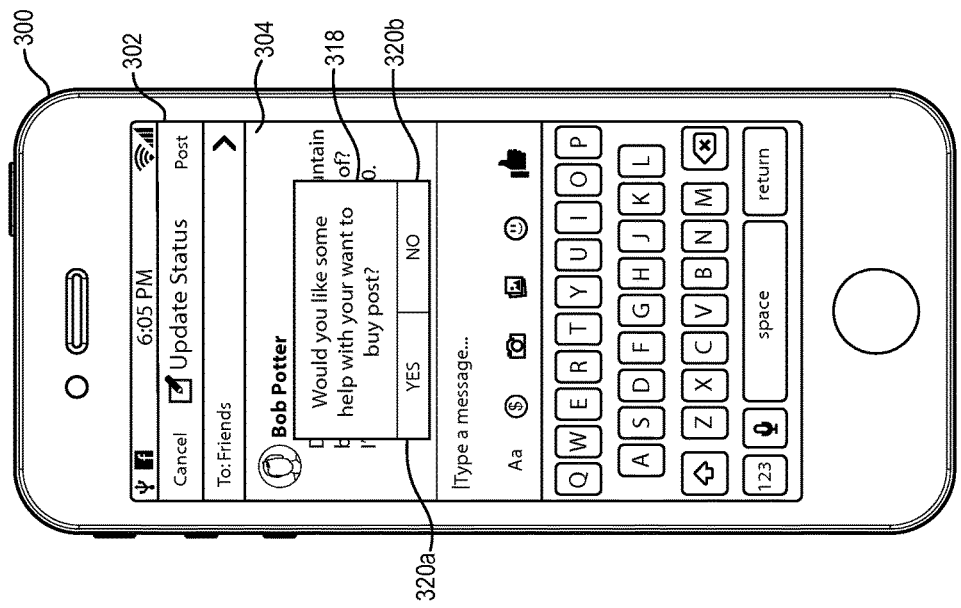
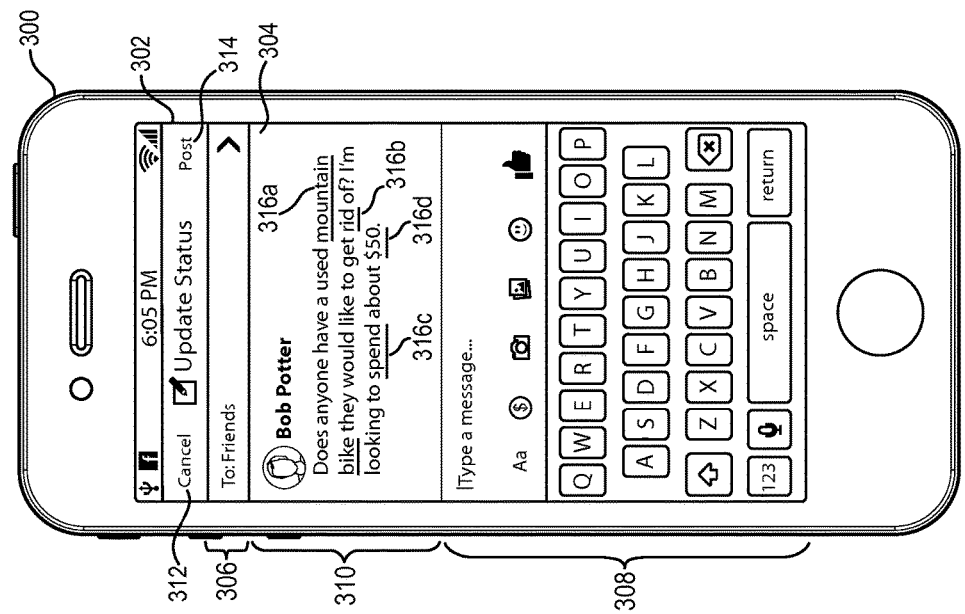

MANAGING COMMERCE-RELATED COMMUNICATIONS WITHIN A SOCIAL NETWORKING SYSTEM

CROSS REFERENCE TO RELATED APPLICATIONS

N/A

BACKGROUND

1. Technical Field

One or more embodiments of the present disclosure relate generally to user-to-user commerce within a social networking system. More specifically, one or more embodiments of the present disclosure relate to managing commerce-related communications within a social networking system.

2. Background and Relevant Art

While commercial settings are commonly utilized for the purchase of goods, people also buy and sell goods in non-commercial settings. For example, garage sales, yard sales, and estate sales provide a setting where individuals can negotiate the sale and purchase of a wide range of goods. These informal, non-commercial settings embody the notion that "one man's trash is another man's treasure," and provide individuals with ways to sell things they no longer want, or purchase things they need for less than they would typically spend in a commercial setting.

It is not surprising that the garage sale format of buying and selling goods has transitioned online via social networking systems. A social networking system generally allows for the formation of forum-like groups. Social networking system users can join a social networking system group to participate in discussions, ask questions, post articles, etc. In some cases, a social networking system group can function like a neighborhood garage sale and allow users to submit sale listings that advertise goods they would like to buy or sell. Users can utilize the functionality of the social networking system to inquire after a particular item they would like to buy, or sell a particular item that they no longer need.

Additionally, users can also buy and sell items within a social networking system independent of social networking groups. For example, a user's personal newsfeed can include social networking posts from other users of the social networking system (e.g., the user's "friends"). The user can also create posts, which may be included in the newsfeeds of other social networking system users. Thus, for example, a user can create a social networking system post advertising an item for sale or inquiring after an item the user would like to purchase, and submit the social networking system post to the social networking system for inclusion in the newsfeeds of other users.

Problems arise when a user utilizes a social networking system to advertise that the user wants to buy a particular item. For example, a user may compose a "want to buy" social networking system post (otherwise known as an "in search of" or "ISO" post) that describes the particular item the user is looking to purchase, and asking whether another social networking system user may be willing to sell the particular item or have information for purchasing the particular item. Want to buy posts, however, are generally not uniform because each post is simply composed in whatever manner that the author sees fit. Furthermore, social networking systems conventionally treat want to buy posts with little to no regard for their unique nature. This makes it difficult for users to distinguish between a standard post and a want to buy post. In addition, social networking systems do not conventionally optimize the delivery of want to buy posts to other social networking system users. For example, the social networking system may not deliver the want to buy post to users that would be most interested in the posts. Thus, both potential buyers and sellers may lose out on transaction opportunities made available through want to buy posts because of the nature and treatment of typical social networking communications.

Thus, there are several disadvantages to current methods for managing commerce-related communications within a social networking system.

SUMMARY

One or more embodiments described herein provides benefits and/or solve one or more of the foregoing or other problems in the art with systems and methods for managing commerce-related communications within a social networking system. One or more embodiments described herein include systems and methods commerce-related communication for identifying social networking system posts that are likely "want to buy" posts. For example, various features of a social networking system post can trigger the social networking system to prompt the post author to confirm that the social networking system post is actually a "want to buy" post. If the post author indicates that the social networking system post is a want to buy post, one or more embodiments described herein can assist the post author in generating a standardized want to buy post.

Additionally, one or more embodiments described herein can identify the best social networking system groups in which to submit a want to buy post. For example, an embodiment described herein can identify the particular item featured in a want to buy post and prompt the post author to submit the want to buy post to a social networking group where the particular item is frequently bought and sold. Thus, one or more embodiments ensure that the want to buy post is submitted to a group of social networking system users who are most likely to be interested in and/or respond to the want to buy post.

Furthermore, one or more embodiments described herein can identify a particular item featured in a want to buy post and suggest existing sale listings to the author of the want to buy post that feature the particular item. For example, an embodiment described herein can search sale listings within social networking system groups and posted to individual feeds to identify sale listings related to a particular item. Thus, a user can be provided with opportunities to buy a particular item either before or immediately following when the user submits a want to buy post for the particular item.

Additional features and advantages of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments of the disclosure will be described and explained with additional specificity and detail through the use of the accompanying drawings in which:

FIGS. 3A-3C illustrate a series of user interfaces in accordance with one or more embodiments;

DETAILED DESCRIPTION

Figure 1:
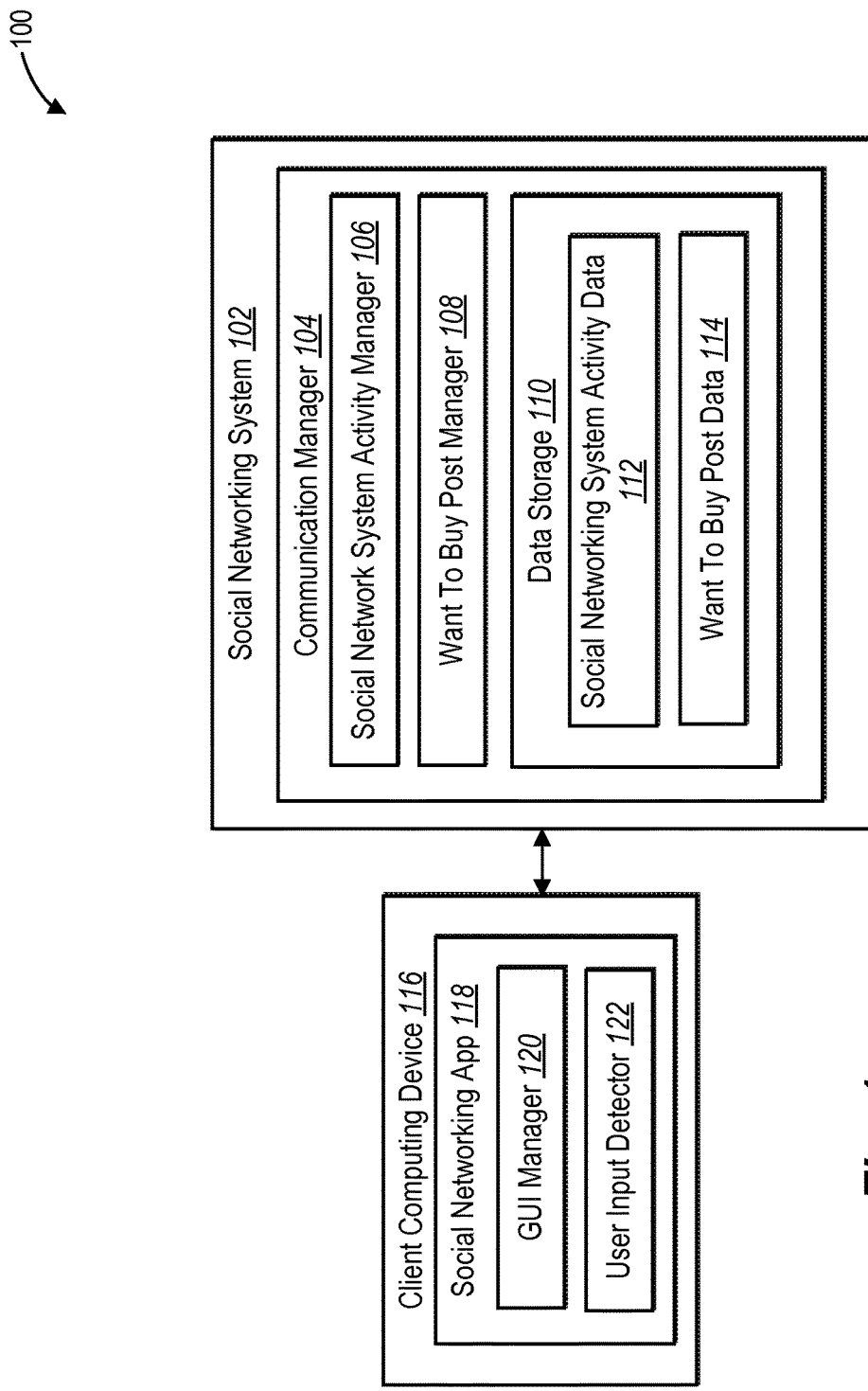
FIG. 1 illustrates a detailed schematic diagram of a system in accordance with one or more embodiments.

One or more embodiments described herein provide benefits and/or solve one or more of the foregoing or other problems in the art with systems and methods for managing commerce-related communications within a social networking system. For example, the communications system of one or more embodiments described herein can identify triggers within a user's social networking system activities that indicate the user wants to buy a particular item. In one or more embodiments, the communications system can identify triggers within a user's social networking system search behavior and/or within a social networking system post composed or being composed by the user. Upon identifying one or more triggers, the communications system can prompt the user to confirm that the user would like to compose a "want to buy" post.

In response to the user confirming that he would like to compose a want to buy post, the communications system can generate a want to buy post featuring various ways to optimize the want to buy post. For example, the communication system can provide the user with a pre-formatted want to buy post. The pre-formatted want to buy post can include information taken from the user's social networking system post that triggered the communications system. Additionally, the communications system can provide other information in the pre-formatted want to buy post, such as a digital photograph of the particular item the user wants to buy, a suggested price offer, various keywords and other optimized language.

Furthermore, the communications system can also optimize the want to buy post by suggesting various social networking system groups and newsfeeds where the want to buy post will be seen by social networking users who can likely make an offer to sell the particular item to the author of the want to buy post. For example, the communications system can identify one or more social networking system for-sale groups that include transactions or other posts focused on items similar to that featured in the want to buy post. Similarly, the communications system can identify newsfeeds of social networking system users who are likely interested in selling items similar to that featured in the want to buy post. Accordingly, the communication system described herein can provide these groups and newsfeeds as recommended options where the want to buy post author can submit the want to buy post for the most success.

Additionally, the communications system can further streamline the want to buy post author's search process by identifying sale listings for the particular item in which the author is interested before the author submits the want to buy post. For example, the communications system can identify the particular item in which the want to buy post author is interested while the author is in the process of composing the want to buy post. The communications system can then search for the particular item among existing sale listings within the social networking system (e.g., based on posts received from users wanting to sell items to other users), and provide the identified sale listings to the want to buy post author.

Furthermore, in one or more embodiments, a user's social networking system activities can trigger the communications system to generate a want to buy post or to provide the author with sale listings featuring a particular item. For example, the communications system can identify a particular item a social networking system user is apparently interested in by analyzing the user's search queries and other search behavior. In response to determining that the user is likely interested in purchasing a particular item, the communications system can prompt the user to compose a want to buy post, or can simply provide the user with one or more existing sale listings that are related to the particular item.

As used herein, the term "social networking system" refers to a system that supports and enables on-line communication, input, interaction, content-sharing, and collaboration between users. A user of the social networking system can have one or more "friends" via the social networking system. As used herein, the term "friend" refers to a co-user associated with a user via the social networking system (i.e., a contact of connection). Furthermore, as used herein, a "for-sale group" is a group within the social networking system where users (who may or may not be friends) can submit standard social networking system posts, as well as sale listing posts that advertise items that are for sale. By utilizing the functionality of the social networking system (i.e., via comments, messages, "likes," etc.), purchasers and sellers can coordinate the purchase and sale of items through for-sale groups. For-sale groups may or may not require participants to become a group member before viewing and/or submitting sale listings.

As mentioned above, in one or more embodiments, a user may submit one or more social networking system posts via a social networking system. As used herein, a "post" refers to an electronic communication submitted by a social networking system user to the social networking system. In one embodiment, a post is an electronic communication from a user that the social networking system posts to a profile page of the user (e.g., within a "timeline" of posts associated with a user) and/or displays within newsfeeds associated with friends of the user. Additionally or alternatively, a post can be an electronic communication from a user that the social networking system posts to a profile page of a particular group and/or within the newsfeeds of group members within the social networking system.

In one or more embodiments, a user may send one or more electronic messages via the social networking system. As used herein, a "message" refers to an electronic communication sent from one user to one or more other users via the social networking system. In one or more embodiments, a message is a private message between only a sender and one recipient. Rather than posting a message to a newsfeed, as described above, the social networking system can deliver the message to a private inbox associated with the recipient. Additionally or alternatively, a message can be a private message between only a sender and a group of recipients. In that case, the social networking system can deliver a copy of the private message to an inbox associated with each member of the group of recipients. Other examples of messages include text messages, instant messages, or any other electronic message.

As mentioned above, while a social networking system is predominantly concerned with enabling social networking system communications between users, in one or more embodiments as mentioned above, the social networking system can also enable user-to-user commerce. For example, in one embodiment, a social networking system can support for-sale groups or communities of users who are interested in the purchase and/or sale of various items. For instance, a social networking system for-sale group may be dedicated to the purchase and sale of classic car parts. By utilizing various features of the social networking system, the members of the classic car parts group can communicate with each other about parts for sale, prices, locations, etc., and eventually arrange for the sale and purchase of the parts. In one embodiment, the social networking system can include payment features that allow for a group member to fund the transaction and complete the sale via the for-sale group.

In one or more embodiments described herein, an item seller may utilize the social networking system to facilitate the advertisement and sale of the item. For example, in one embodiment, the seller can compose a social networking system post that advertises the item for sale (or simply a "sale listing"). As used herein, a "sale listing" within a for-sale group or personal profile refers to a social networking system post composed by an item seller that advertises the item for sale. The seller can include information related to the product in the social media post, which the social networking system can convert into structured data associated with the sale listing.

For example, as used herein, "structured data" can include any data that is structured into specific groups, fields, or categories and/or associated with particular aspects of a post, a person, or a product being sold. Structured data can include metadata associated with node and edge information related to the social networking system post, information related to the post author, information related to a particular item featured in the post, and interaction information related post within the social networking system.

To illustrate, structured data for a want to buy post may include the post author's name, a description of the particular item the author would like to buy, a price, the author's location, or any other specific types of information/data associated with the author's inquiry regarding the particular item. The structured data may also include various media content, such as images (e.g., pictures of a particular item), video, audio, etc. Using this structured data, the social networking system can facilitate the insertion of "rich" objects within a newsfeed or elsewhere, such rich objects providing more information and/or content than typical textual objects. For example, based on an identification of a particular item referenced in a want to buy post, and based on the identification of a node associated with the particular item, the social networking system may augment the post with information, media, and/or formatting from the node associated with the particular item (e.g., information, media, and/or formatting previously obtained from other users or third-party websites).

Furthermore, in one or more embodiments described herein, a social networking system user can utilize social networking system features to broadcast the fact that the user wants to buy a particular item. In at least one embodiment, the user can do this with a "want to buy" post. As used herein, a "want to buy" (also know as an "in search of" or "ISO") post refers to a social networking system post in which the post author details a desire to purchase a particular item. The post author can do this by including text (e.g., an item description, a geographic location, a desired item condition, etc.), keywords, transactional details (e.g., an offered price, a proposed pickup location, etc.), multimedia (e.g., a digital picture of the desired item), etc. in the post. The social networking system can include want to buy posts in personal newsfeeds and/or on group profile pages (e.g., for-sale groups) depending on the audience and/or privacy settings specified by the post author for the want to buy post. Even though standard social networking system posts and want to buy posts include many similar elements, they are generally different in that a want to buy post author composes the want to buy post for the purpose of identifying a seller of a particular item.

FIG. 1 illustrates a schematic diagram illustrating an example embodiment of a communication system 100 (or simply "system 100"). As shown in FIG. 1, the system 100 may include various components for performing the processes and features described herein. For example, as shown in FIG. 1, the system 100 may include, but is not limited to, a social networking system 102, a communications manager 104, and one or more client computing devices 116. The communications manager 104 can include, but is not limited to, a social networking system activity manager 106, a want to buy post manager 108, and data storage 110, which includes social networking system activity data 112 and want to buy post data 114. The client computing device 116 can include a social networking application 118, which includes a graphical user interface ("GUI") manager 120 and a user input detector 122.

The social networking system 102, each of the components 104-114 of the communications manager 104, and each of the components 120-122 of the social networking application 118 can be implemented using one or more computing devices including at least one processor executing instructions that cause the system 100 to perform the processes described herein. In some embodiments, the components 102-122 can all be implemented by a single server device, or across multiple server devices. Additionally or alternatively, a combination of one or more server devices and one or more client devices can implement the components 102-122. Furthermore, in one embodiment, the components 102-122 can comprise hardware, such as a special-purpose processing device to perform a certain function. Additionally or alternatively, the components 102-122 can comprise a combination of computer-executable instructions and hardware. Additional information regarding example computing devices, computer systems, social networking systems, and social graphs is provided below.

In one or more embodiments, the social networking application 118 can be a native application installed on the client computing device 116. For example, the social networking application 118 may be a mobile application that installs and runs on a mobile device, such as a smart phone or a tablet. Alternatively, the social networking application 118 can be a desktop application, widget, or other form of a native computer program. Alternatively, the social networking application 118 may be a remote application accessed by the client computing device 116. For example, the social networking application 118 may be a web application that is executed within a web browser of the client computing device 116.

As mentioned above, and as shown in FIG. 1, the social networking application 118 can include a graphical user interface (or simply "GUI") manager 120. The GUI manager 120 can provide, manage, and/or control a graphical user interface (or simply "user interface") that allows a user to compose, view, and submit want to buy posts, sale listings, as well as other social networking system posts and messages made available through the social networking system 102. For example, the GUI manager 120 can provide a user interface that facilitates the display of a for-sale group profile page containing one or more sale listings. Likewise, the GUI manager 120 can provide a user interface that facilitates the display of a social networking system user's newsfeed or profile page. Similarly, the GUI manager 120 can provide a user interface that displays one or more electronic messages received by a social networking system user.

More specifically, the GUI manager 120 can facilitate the display of a user interface (e.g., by way of a display device associated with the client computing device 116). For example, the GUI manager 120 may compose the user interface of a plurality of graphical components, objects, and/or elements that allow a user to compose, send, and receive electronic messages, social networking system posts, and/or sale listings and want to buy posts. More particularly, the GUI manager 120 may direct the client computing device 116 to display a group of graphical components, objects, and/or elements that enable a user to view electronic messages, social networking system posts, and/or sale listings and want to buy posts.

In addition, the GUI manager 120 may direct the client computing device 116 to display one or more graphical objects, controls, and/or elements that facilitate user input for composing, sending, and/or submitting a social networking system post (e.g., a sale listing or want to buy post) or other electronic message. To illustrate, the GUI manager 120 may provide a user interface that allows a user to provide user input to the social networking application 118. For example, the GUI manager 120 can provide one or more user interfaces that allow a user to input one or more types of content into a social networking system post, an electronic message, a sale listing, or a want to buy post. As used herein, "content" refers to any data or information to be included as part of a social networking system post, message, or listing. For example, the term "content" will be used herein to generally describe text, images, digital media, files, location information, payment information, or any other data that can be included as part of a social networking system post, message, or listing.

As mentioned, the GUI manager 120 can facilitate the input of text or other data to be included in a social networking system post, message, or listing. For example, the GUI manager 120 can provide a user interface that includes a touch display keyboard. A user can interact with the touch display keyboard using one or more touch gestures to input text to be included in a social networking system post, message, or listing. For example, a user can use the touch display keyboard to enter a description of an item in a want to buy post. In addition, the touch display keyboard can facilitate the input of various other characters, symbols, icons, or other information.

Furthermore, the GUI manager 120 can provide and transition between two or more graphical user interfaces. For example, in one embodiment, the GUI manager 120 can provide a newsfeed to a social networking system user containing one or more social networking system posts from co-users associated with the user via the social networking system. Later, in response to detected input from the user or the communications manager 104, the GUI manager 120 can transition to a second graphical user interface that includes listings and posts within a particular social networking group.

In accordance with the foregoing, and as further illustrated in FIG. 1, the social networking application 118 can include a user input detector 122. In one or more embodiments, the user input detector 122 can detect, receive, and/or facilitate user input in any suitable manner. In some examples, the user input detector 122 can detect one or more user interactions with respect to the user interface. As referred to herein, a "user interaction" means a single interaction, or combination of interactions, received from a user by way of one or more input devices.

For example, the user input detector 122 can detect a user interaction from a keyboard, mouse, touch pad, touch screen, and/or any other input device. In the event the client computing device 116 includes a touch screen, the user input detector 122 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The user input detector 122 may additionally, or alternatively, receive data or other input through one or more user interactions. For example, the user input detector 122 may receive user input representative of one or more user configurable parameters from a user, one or more user commands from the user, and/or any other suitable input. The user input detector 122 may receive input data from one or more components of the social networking system 102, or from one or more remote locations.

The social networking application 118 can perform one or more functions in response to the user input detector 122 detecting user input and/or receiving other data. Generally, a user can control, navigate within, and otherwise use the social networking application 118 by providing one or more user inputs that the user input detector 122 detects. For example, in response to the user input detector 122 detecting user input, one or more components of the social networking application 118 allow a user to select a recipient for a message, compose a message, select content to include in a message, and/or send a message to the recipient. Additionally, in response to the user input detector 122 detecting user input, one or more components of the social networking application 118 allow a user to navigate through one or more user interfaces to review received electronic messages, sale listings, want to buy posts, etc.

As illustrated in FIG. 1, the communications system 100 can include the social networking system 102, which may be implemented using one or more server devices. The social networking system 102 can also provide social networking system posts (whether text or otherwise) to a social networking graphical user interface (e.g., a profile, a newsfeed, or "timeline") of one or more users of the social networking system 102. For example, one or more embodiments may present a user with a social networking system newsfeed and electronic messages from one or more co-users associated with the user via the social networking system 102. In one or more embodiments, the user may scroll through the social networking system newsfeed in order to view recent social networking system activity and/or posts submitted by co-users associated with the user via the social networking system 102. In one embodiment, the social networking system 102 may organize the social networking system posts (e.g., want to buy posts, etc.) chronologically in a user's social networking system newsfeed. In alternative embodiments, the social networking system 102 may organize the social networking system posts geographically, by interest groups, according to a relationship coefficient between the user and the co-user, and/or in accordance with any other metrics indicating user interest the corresponding social networking system activity. Additionally, in one or more embodiments, the user may download a copy of the social networking system newsfeed as a record of the social networking system posts displayed therein.

Additionally, in one embodiment, the social networking system 102 can transmit social networking system posts and/or electronic messages between users. For example, in response to a user submitting a social networking system post to the social networking system 102, the social networking system 102 can update the social networking system newsfeeds of the co-users who are "friends" with the user or in a common social networking group. Furthermore, in one embodiment, the social networking system 102 can transmit an electronic message between just two users. In that case, the social networking system 102 does not add the electronic message to the social networking system newsfeed of a plurality of co-users, but rather provides the electronic message within a social networking system graphical user interface (e.g., an inbox) of one or more message recipients. In other words, an electronic message can be a private message between two users of the social networking system 102, and a social networking system post may be a semi-public message that the social networking system 102 adds to the social networking system newsfeed of a plurality of co-users of the social networking system 102.

As mentioned above, and as illustrated in FIG. 1, the social networking system 102 can further include the communications manager 104, which can manage all communications activities in connection with the social networking system 102. The communications manager 104 can include a social networking system activity manager 106, which in turn can communicate with the social networking system 102 to receive various types of information. In one or more embodiments, the social networking system activity manager 106 can receive information related to social networking system users, as well as information related to social networking system groups and the posts and listings therein.

For example, the social networking system activity manager 106 can receive information related to a social networking system user including demographic information for the user. In one or more embodiments, a user's demographic information can include, but is not limited to, the user's education, location, hometown, birthday, employment, salary, family and romantic relationships, and so forth. Additionally, a user's demographic information can be related to the user's personal interests (e.g., favorite books, movies, restaurants, etc.). The social networking system activity manager 106 can identify this information through an analysis of the user's social networking system profile, account information, or via other social networking system activities in which the user engages.

Furthermore, the social networking system activity manager 106 can receive information related to social networking system relationships between users. For example, a social networking system user may be "friends" with one or more additional users. Thus, in one or more embodiments, the user can view social media posts submitted by friends, comment on friends' social media posts, reply to messages sent by friends, add tags to photographs and videos submitted by friends, view location check-ins of friends, etc. The social networking system activity manager 106 can identify information related to any of these user-to-user interactions.

Additionally, the social networking system activity manager 106 can receive information related to specific activities in which a social networking system user engages. For example, through the social networking system, a social networking system user can submit posts, send private messages, comment on other user's posts and media, tag posts and media, "like" other user's posts and comments, submit sale listing, and share the posts and/or sale listings of other users. In one or more embodiments, the social networking system activity manager 106 can identify the content of any of these types of interactions, as well as structured data associated with the post, message, comment, sale listing, etc.

The social networking system activity manager 106 can also receive information related to other activities in which a user engages such as media uploads, user tags, and check-ins. For example, in one or more embodiments, a user can upload various media (e.g., digital photographs, digital videos, audio files, etc.) to the social networking system for inclusion in posts, messages, archives, etc. Additionally, in one or more embodiments, the user can tag other users in connection with uploaded media and/or posts, sale listings, etc. As used herein, tagging a user simply means that the social networking system creates a record that the tagged user is associated (e.g., as being present, at the same location, etc.) with the media and/or post in which the tagged user is tagged. Furthermore, in one or more embodiments, the user can check-in at various locations, as a way of informing friends of the user's presence at a given location. The social networking system activity manager 106 can identify information related to any of these activities.

Furthermore, the social networking system activity manager 106 can receive information related to various web page interactions that a user makes in connection with the social networking system 102. For example, as described above, the social networking system 102 can present a range of content via one or more web pages. Accordingly, the social networking system activity manager 106 can receive information related to a social networking system user's clicks (e.g., clicks on various hyperlinks or other controls), the social networking system user's views (e.g., of web pages, media, or other web content), and the social networking system user's scrolls (e.g., how quickly the user scrolls through content, scroll positions associated with where the user pauses in a web page, etc.).

As mentioned above, the social networking system activity manager 106 can also receive information related to for-sale groups and the posts, and sale listings therein. For example, the social networking system activity manager 106 can receive information associated with the membership of a for-sale group. In one or more embodiments, in order for a social networking system user to view and/or submit sale listings to a particular for-sale group hosted by the social networking system, the user must first be a member of the for-sale group. Generally, a user may be a member of multiple for-sale groups. Accordingly, the social networking system activity manager 106 can receive information detailing the membership records of any for-sale group hosted by the social networking system 102.

In addition to information about a for-sale group's member records, the social networking system activity manager 106 can receive additional information specific to a for-sale group. For example, the social networking system activity manager 106 can receive information associated with all the posts and listings included in a particular for-sale group. As described above, a post is an electronic communication from a user that the social networking system 102 can post to a newsfeed. Also as described above, a user submits a sale listing to advertise an item for sale.

In one or more embodiments, a for-sale group may include both posts and sale listings. Accordingly, the social networking system activity manager 106 can receive information associated with both the posts and the sale listings included in a for-sale group. Information associated with posts and sale listings can include, but is not limited to, the content of a post or sale listing, social networking system activity associated with a post or sale listing, and structured data associated with a post or sale listing. In one or more embodiments, the content of a post or sale listing can include text, and/or media (e.g., digital photographs, digital video, etc.). Additionally, in one or more embodiments, social networking system activity associated with a post or sale listing can include comments associated with the post or sale listing, messages associated with the post or sale listing, "likes" associated with a post or sale listing, "shares" of the post or sale listing, tags associated with the post or sale listing, check-ins associated with the post or sale listing, views associated with the post or sale listing, etc. Furthermore, structured data associated with a post or sale listing can include information associated with the social networking system user who submitted the post or sale listing, information detailing the date and time the social networking system user submitted the post or sale listing, information associated with social networking system users who engaged in social networking activity associated with the post or sale listing, or any other type of structured data.

The social networking system activity manager 106 can also receive descriptive information associated with a for-sale group. For example, the social networking system activity manager 106 can receive information that describes the for-sale group (e.g., the stated purpose of the for-sale group, types of items typically sold via the for-sale group, etc.), information related to the amount of web traffic the for-sale group experiences, information related to an average amount of time a sale listing is active via the for-sale group, etc.

As mentioned above, and as illustrated in FIG. 1, the communications manager 104 can also include a want to buy post manager 108. Also as mentioned above, in one or more embodiments, a social networking system user can compose a "want to buy" post. A want to buy post is a social networking system post wherein a user advertises his desire to purchase a particular item. A want to buy post can include text and media, and the social networking system 102 can cause the want to buy post to be displayed on one or more newsfeeds of friends of the want to buy post author. Additionally or alternatively, the want to buy post author can submit the want to buy post for inclusion in one or more for-sale groups. Accordingly, the want to buy post manager 108 can receive, organize, analyze, and distribute want to buy posts submitted to the social networking system 102.

Additionally, in one or more embodiments, the want to buy post manager 108 can determine that a user is in the process of composing a want to buy post. For example, the want to buy post manager 108 can identify a plurality of triggers that indicate that a social networking system user is in the process of composing a want to buy post, as opposed to a normal social networking system post. In one or more embodiments, the want to buy post manager 108 can identify a plurality of triggers including, but not limited to, composing a post including certain keywords, composing a post including certain brand names, composing a post including certain media, composing a post including certain acronyms, composing a post including certain phrases, etc. By way of example, the want to buy post manager 108 can identify a trigger in a post that a user is composing including the text, "I'm looking to buy a new road bike." Similarly, in another example, the want to buy post manager 108 can identify a trigger in a post that a user is composing including a digital image of a bike and the phrase, "I'll pay $50." Accordingly, in response to identifying one or more triggers in a post being composed by a user, the want to buy post manager 108 can determine that the post is likely a want to buy post. The want to buy post manager 108 can identify various triggers utilizing natural language processing, databases, grammar, web lookups, etc.

The want to buy post manager 108 can also identify triggers within a user's social networking system activities. For example, in one or more embodiments, the social networking system 102 can include various search capabilities. These search capabilities allow a user to perform searches for social networking system users, events, groups, sale listings, etc. In at least one embodiment, the want to buy post manager 108 can determine that the user wants to buy a particular item in response to identifying searches performed by the user for the particular item within the user's search history. For example, the want to buy post manager 108 can determine that a user wants to buy a new pair of running shoes based on three prior searches performed by the user for a particular type of running shoes.

In an additional or alternative embodiment, the user's social networking system activities can include comments, messages, page views, "likes," etc. Accordingly, in at least one embodiment, the want to buy post manager 108 can determine that the user wants to buy a particular item in response to identifying comments, messages, page views, etc. that are related to the particular item. For example, the want to buy post manager 108 can determine that the user wants to buy a particular book in response to identifying the user's comment, "Hey, I love this book! Do you know where I can buy it?" on a co-user's social networking system post related to the book.

In one or more embodiments, the want to buy post manager 108 can apply a weight to various identified triggers. For example, the want to buy post manager 108 may not determine that a user wants to buy a particular item until the want to buy post manager 108 determines that an aggregate weight of identified triggers surpasses a predetermined threshold amount. By way of example, the want to buy post manager 108 may assign a heavier aggregate weight to an identified triggers within a phrase including transactional language (e.g., "Looking to buy a new desk fan for less than $20, can pick up in the downtown area) than to an identified triggers within a phrase merely including "wish" language (e.g., "I really wish I had a new dish washer!").

In response to the want to buy post manager 108 identifying one or more triggers, or determining that the aggregate weight of the one or more triggers exceeds a predetermined threshold, the want to buy post manager 108 can prompt a user for confirmation that the user is composing a want to buy post. For example, as mentioned above, the want to buy post manager 108 can identify one or more triggers in a social networking system post as the post is being composed. Accordingly, at that point, the want to buy post manager 108 can prompt post author to confirm that the author is composing a want to buy post. The want to buy post manager 108 can prompt the post author via a pop-up notification, or via another similar type of notification. In one or more embodiments, the prompt can further request confirmation of various transactional details related to the want to buy post.

In response to a post author confirming that the author is composing a want to buy post, the want to buy post manager 108 can generate a standardized want to buy post that includes reformatted portions of the author's post. For example, the want to buy post manager 108 can reformat the author's post such that the description of the particular item the author wants to buy is mentioned in the first sentence, followed by any transactional details in the second sentence (e.g., how much the author is willing to pay, whether the author is willing to pick the item up, etc.). Additionally, the want to buy post manager 108 can clean up the author's post such that the resulting want to buy post includes standardized spacing, spelling, grammar, etc. In at least one embodiment, the post author can specify, as part of the post author's account settings, a preferred format for want to buy posts.

Further in response to a post author confirming that the author is composing a want to buy post, the want to buy post manager 108 can identify and suggest additions to the existing post. For example, in response to a post author composing a want to buy post advertising his desire to purchase a used road bike, the want to buy post manager 108 can identify retail descriptions, pictures, videos, price suggestions, etc. for the bike the post author is interested in. The want to buy post manager 108 can identify these details from databases, Internet lookups, and other similar repositories. In at least one embodiment, the want to buy post manager 108 can suggest these details to the post author for inclusion in the want to buy post.

Similarly, the want to buy post manager 108 can suggest changes or additions to the post author's text within the generated want to buy post for approval by the post author. For example, the want to buy post manager 108 can suggest language that makes the post author's intentions more clear. To illustrate the want to buy post manager 108 may suggest that the post author change the text of the post author's want to buy post from, "I wish I could get my hands on this new designer purse. Does anyone want to trade me for $50. LOL!" to "I'd like to buy this used designer purse for $50. Please message me!"

Similarly, the want to buy post manager 108 can suggest the addition of acronyms and phrases that hold significant meaning among users who frequently buy and sell goods via the social networking system 102. For example, the want to buy post manager 108 can further suggest, "ISO this used designer purse for $50. Willing to pickup! PM me!" where "ISO" generally means "in search of," "willing to pickup" means the post author is willing to drive to where the seller is located, and "PM" generally means "private message." The want to buy post manager 108 can further suggest the inclusion of brand names, trademarks, phrases, and buzz words in order to make the want to buy post more noticeable by social networking system users, and more searchable by the social networking system 102.

Furthermore, the want to buy post manager 108 can suggest the inclusion of various payment mechanisms within the generated want to buy post. For example, the social networking system 102 can include payment functions that allow for the transfer of funds between individual social networking system users. Accordingly, in at least one embodiment, the want to buy post manager 108 can suggest the inclusion of buttons, links, etc. within the generated want to buy post to facilitate the use of these payment functions.

Additionally, in response to determining that the post author wants to buy a particular item and is composing a want to buy post for that particular, the want to buy post manager 108 can identify existing sale listings related to the particular item and provide those identified sale listings to the post author. As mentioned above, the social networking system 102 can host various groups. In one or more embodiments, a subset of the hosted groups can be for-sale groups that are dedicated to the purchase and sale of various types of goods via sale listings and want to buy posts. For example, in response to determining that a post author wants to buy a particular television, the want to buy post manager 108 can identify one or more sale listings in one or more for-sale groups that are related to the particular television. The identified one or more identified sale listings can advertise the particular television, or can advertise other similar televisions. Furthermore, the want to buy post manager 108 can identify only those sale listings related to the particular item that are within a convenient travel radius from the post author.

Additionally, in response to determining that the post author wants to buy a particular item and is composing a want to buy post for that particular item, the want to buy post manager 108 can identify web listings for the particular item via one or more ecommerce websites. For example, in response to determining that a post author wants to buy a particular television, the want to buy post manager 108 can identify one or more web listings featured on one or more ecommerce websites for the particular television, or other similar televisions. In at least one embodiment, the want to buy post manager 108 can identify web listings based on databases, web searches, etc.

Furthermore, in an alternative embodiment and in response to determining that the post author wants to buy a particular item, the want to buy post manager 108 can identify standard social networking system posts that are related to the particular item. For example, a friend of the post author may frequently submit standard posts related to a particular mattress. Even though the post author's friend may not have submitted any sale listings for the particular mattress, the want to buy post manager 108 can identify the friend's standard posts related to the particular mattress in response to determining that the post author wants to buy that particular mattress.

After the want to buy post manager 108 identifies one or more sale listings and/or web listings related to the particular item a post author wants to buy, the want to buy post manager 108 can generate a personalized web page containing a listing of the one or more sale listings and/or web listings. For example, the want to buy post manager 108 can generate a listing including an interactive display element for each of the one or more sale listings and/or web listings. In response to a user interaction with a display element, the want to buy post manager 108 can provide an additional web page containing all details associated with the sale listing or web listing.

Furthermore, as mentioned above, and as illustrated in FIG. 1, the communications manager 104 can also include a data storage 110. As shown, the data storage 110 can include social networking system activity data 112 and want to buy post data 114. In one or more embodiments, the social networking system activity data 112 can include data representative of social networking system activity information, such as describe herein. Similarly, in one or more embodiments, the want to buy post data 114 can include data representative of want to buy post information, such as described herein.

Figure 2:
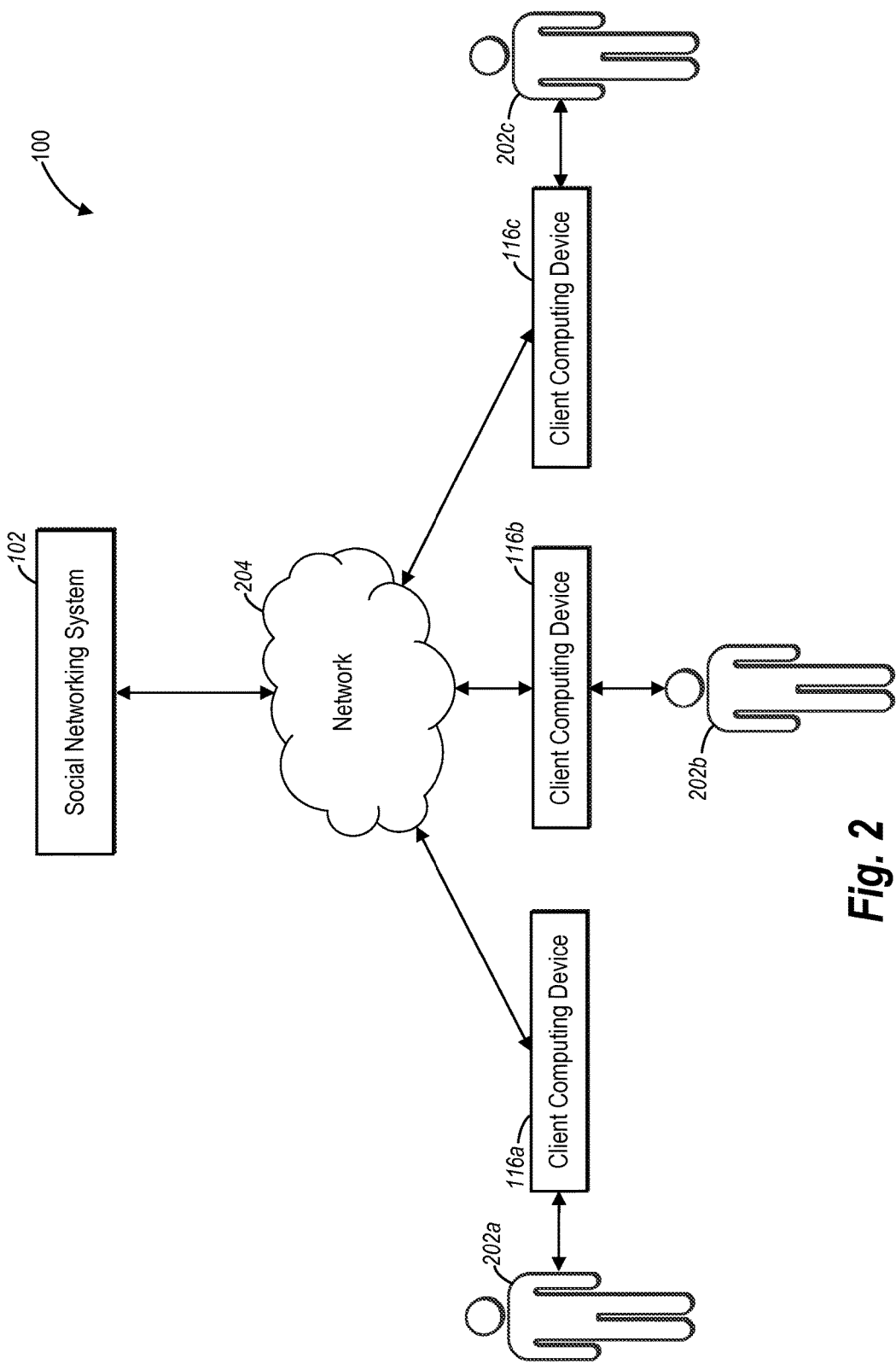
FIG. 2 illustrates a block diagram of an environment for implementing the system of FIG. 1 in accordance with one or more embodiments.

FIG. 2 illustrates an example schematic diagram of the communications system 100. As illustrated in FIG. 2, the communications system 100 may include client computing devices 116a, 116b, and 116c, and the social networking system 102, which are communicatively coupled through a network 204. Also as illustrated in FIG. 2, users 202a, 202b, and 202c may interact with the client computing devices 116a, 116b, and 116c, respectively in order to access content and/or services on the social networking system 102. The client computing devices 116a, 116b, and 116c may access the social networking system 102 via the social networking application 118, as described above with reference to FIG. 1.

The client computing devices 116a, 116b, and 116c and the social networking system 102 can communicate via the network 204, which may include one or more networks and may use one or more communication platforms or technologies suitable for transmitting data and/or communication signals. In one or more embodiments, the network 204 may include the Internet or World Wide Web. The network 204, however, can include various other types of networks that use various communication technologies and protocols, such as a corporate intranet, a virtual private network (VPN), a local area network (LAN), a wireless local network (WLAN), a cellular network, a wide area network (WAN), a metropolitan area network (MAN), or a combination of two or more such networks. Although FIG. 2 illustrates a particular arrangement of the client computing devices 116a, 116b, and 116c, the social networking system 102, and the network 204, various additional arrangements are possible. For example, the client computing devices 116a, 116b, and 116c may directly communicate with the social networking system 102, bypassing the network 204. Additional details relating to the network 204 are explained below with reference to FIG. 7.

As illustrated in FIG. 2, the communications system 100 can include a user. As described above, the users 202a, 202b, 202c may be an individuals (i.e., a human user), businesses, groups, or another entities. Although FIG. 2 illustrates three users 202a, 202b, and 202c, it is understood that the communications system 100 can include a plurality of users, with each of the plurality of users interacting with the communications system 100 through a corresponding plurality of client computing devices.

With referent to the communications system 100 described herein, the users 202a, 202b, and 202c may be senders of social networking system posts or messages, or recipients of social networking system posts or messages. Furthermore, the users 202a, 202b, and 202c may submit and view want to buy posts via the social networking system 102. In some embodiments, a group may require a user 202a, 202b, and 202c to become a group member before the users 202a, 202b, and 202c is allowed to submit and view sale listings and/or want to buy posts. In other embodiments, a group may have an open policy that allows the users 202a, 202b, and 202c to submit and view sale listings and/or want to buy posts without being members of the group.

The client computing devices 116a, 116b, and 116c may include various types of computing devices. For example, the client computing devices 116a, 116b, and 116c can include a mobile device such as a mobile telephone, a smartphone, a PDA, a tablet, a laptop or a non-mobile device such as a desktop, a server, or another type of computing device. Further, the client computing devices 116a, 116b, and 116c may run dedicated social networking applications (e.g., such as the social networking application 118, as described above in relation to FIG. 1) associated with the social networking system 102 to access social networking content (e.g., posts, messages, sale listings, profiles, etc.) associated with the communications system 100. Additional details with respect to the client computing devices 116a, 116b, and 116c are discussed below with respect to FIG. 6.

As described above, the systems and methods performed by the communications system 100 serve to assist a social networking system user in generating and distributing a uniform "want to buy" post. The communications system 100 can react to various triggers in order to prompt a social networking system user for confirmation as to whether the user wishes to compose a want to buy post, as opposed to a standard social networking system post. In response to the user's confirmation, the communications system 100 can assist the user in generating a standardized want to buy post.

As will be described in more detail below, the components of the communications system 100 as described with regard to FIGS. 1 and 2 can provide, along and/or in combination with other components, one or more graphical user interfaces ("GUIs"). In particular, the components can allow a user to interact with a collection of display elements for a variety of purposes. Specifically, FIGS. 3A-4B and the description that follows illustrate various example embodiments of GUIs and features that are in accordance with general principles as described above.

For example, FIGS. 3A-4B illustrate various views of GUIs provided at one of the client computing devices 116a-116c by way of the social networking application 118. As mentioned above, in some embodiments, a client computing device (i.e., the client computing device 116a, 116b, 116c) can implement and/or provide features from the communications system 100. For example, FIG. 3A illustrates a client computing device 300 of a social networking system user (e.g., one of the users 202a-202c) that may implement one or more of the components or features of the communications manager 104. As shown, the client computing device 300 is a handheld device, such as a mobile phone device (e.g., a smartphone). As used herein, the term "handheld device" refers to a device sized and configured to be held/operated in a single hand of a user. In additional or alternative examples, however, any other suitable computing device, such as, but not limited to, a tablet device, larger wireless device, laptop or desktop computer, a personal digital assistant device, and/or any other suitable computing device can perform one or more of the processes and/or operations described herein.

As illustrated in FIG. 3A, the client computing device 300 includes a touch screen display 302 that can display user interfaces and by way of which user input may be received and/or detected. As used herein, a "touch screen display" refers to the display of a touch screen device. In one or more embodiments, a touch screen device may be the client computing device 116a, 116b, or 116c with at least one surface upon which a user may perform touch gestures (e.g., a laptop, a tablet computer, a personal digital assistant, a media player, a mobile phone, etc.). Additionally or alternatively, the client computing device 300 may include any other suitable input device, such as a touch pad or those described below in reference to FIG. 7.

In FIG. 3A, the touch screen display 302 of the client computing device 300 displays a composition GUI 304 provided by the display manager 120 of the social networking application 118 installed thereon. In one or more embodiments, the display manager 120 provides the composition GUI 304 in order to provide various composition controls with which a social networking system user can compose a social networking system post that may or may not be a want to buy post. In at least one embodiment, the composition GUI 304 can include a recipient control 306, input controls 308, a composition control 310, a cancel control 312, and a post control 314.

In one or more embodiments, the composition GUI 304 includes the recipient control 306 that allows a social networking system post author to specify one or more recipients who will receive the post. For example, as shown in FIG. 3A, the post author can utilize the recipient control 306 to instruct the communications manager 104 to eventually add the post being composed by the post author to the newsfeeds of the post author's friends. In at least one embodiment, the post author can utilize the recipient control 306 to instruct the communications manager 104 to add the post to the newsfeed of an individual social networking system user and/or to the newsfeed of one or more social networking system groups.

In one or more embodiments, the composition GUI 304 further includes the input controls 308. For example, as shown in FIG. 3A, the post author can utilize the input controls 308 to input text, select digital media (e.g. digital photographs, digital videos), select emoticons, configure locations, etc. In at least one embodiment, the input controls 308 include a touch screen keyboard and various additional controls that allow the post author to compose the body of the post.

In one or more embodiments, the composition GUI 304 also includes the composition control 310. For example, as shown in FIG. 3A, the composition control 310 can be a text box wherein the post author can compose the body of the post. In at least one embodiment, the post author can click or tap within the composition control 310 in order to edit specific portions of the post.

As mentioned above, one or more triggers can exist within the composition GUI 304 that cause the communications manager 104 to prompt the post author to confirm that the post author is composing a "want to buy" post. Triggers can include certain keywords within a post, certain brand names within a post, certain multimedia within a post, certain acronyms within a post, certain phrases within a post, etc.

For example, as shown in FIG. 3A, any of the triggers 316a-316d can cause the communications manager 104 to prompt the post author for confirmation of a want to buy post. For example, the communications manager 104 may identify the trigger 316a (i.e., "mountain bike") as a product name. Similarly, the communications manager 104 may identify the triggers 316b and 316c (i.e., "rid" and "spend") as words or keywords that are commonly used in want to buy post. Finally, the communications manager 104 may identify the trigger 316d (i.e., "$50") as transactional language commonly found in want to buy posts. In one or more embodiments, the communications manager 104 may cause the triggers 316a-316d to be highlighted (e.g., underlined, text color changed, etc.) within the composition control 310. Alternatively, the communications manager 104 may not cause any change within the display of the post within the composition control.

As mentioned above, the communications manager 104 can prompt the post author for confirmation of a want to buy post in response to identifying one or all of the triggers 316a-316d. Additionally or alternatively, the communications manager 104 may determine a weight associated with the triggers 316a-316d and prompt the post author when the aggregate weight associated with the triggers 316a-316d is above a threshold amount. For example, the communications manager 104 may determine a heavier weight for product names (as in the trigger 316a) and transactional language (as in the trigger 316d), while determining lighter weights for certain phrases and keywords (as in the triggers 316b and 316c).

In response to identifying and/or determining an aggregate weight of the triggers 316a-316d, the communications manager 104 can prompt the post author to confirm that the post displayed within the composition control 310 is actually a want to buy post. For example, as shown in FIG. 3B, the communications manager 104 can prompt the post author for confirmation via the confirmation pop-up window 318. In one or more embodiments, the confirmation pop-up window 318 includes a message that causes the post author to confirm whether the post in the composition control 310 is a want to buy post. In at least one embodiment, the post author can either confirm or deny that the post in the composition control 310 is a want to buy post via the yes/no controls 320a, 320b. In one or more embodiments, the communications manager 104 can provide the confirmation pop-up window 318 over the composition GUI 304 within the touch screen display 302 of the client computing device 300.

Figure 3C:
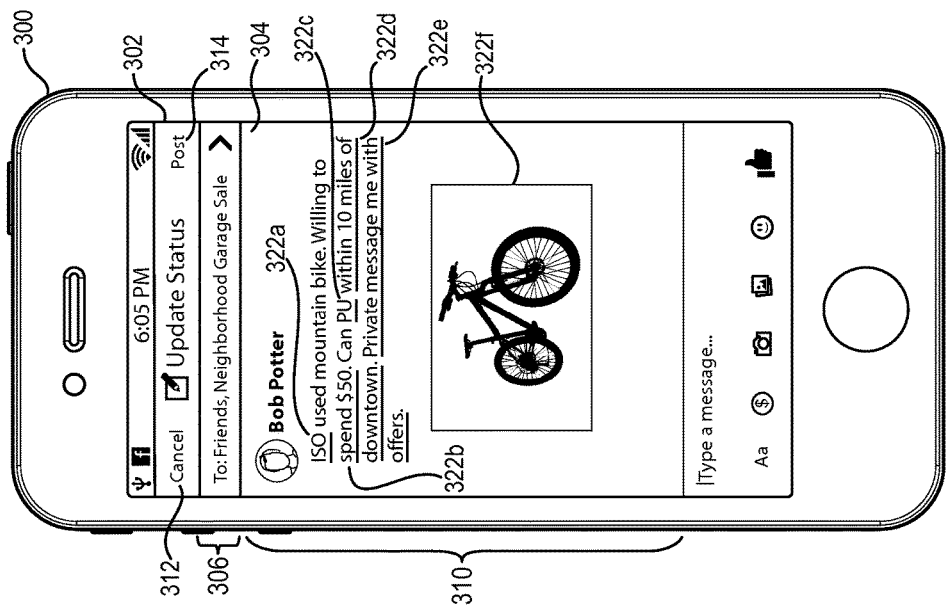

In response to the post author confirming that the post displayed in the composition control 310 is indeed a want to buy post, the communications manager 104 can generate a standardized want to buy post. For example, as shown in FIG. 3C, the communications manager 104 can generate the want to buy post by reformatting the post author's existing composition and making various suggestions on how to improve the generated want to buy post. In one or more embodiments, the communications manager 104 can generate the want to buy post such that a sentence including the particular item the post author wants to buy is positioned at the beginning of the post, followed by transactional details and contact information. In additional or alternative embodiments, the communications manager 104 can generate the want to buy post in other ways. Furthermore, in at least one alternative embodiment, the post author can pre-specify a standard formatting for all future want to buy posts.

Additionally, the communications manager 104 can suggest additions or alterations to the want to buy post displayed in the composition control 310. For example, as shown in FIG. 3C, the communications manager 104 can add post suggestions 322a-322f. In one or more embodiments, the communications manager 104 can make suggestions to include words, phrases, acronyms, etc. in the want to buy post that will likely optimize the want to buy post and attract the attention of social networking system user who will sell the particular item that the post author would like to buy. In at least one embodiment, the communications manager 104 can make suggestions based on historical data within the social networking system that indicates how well certain words, phrases, acronyms, etc. perform in want to buy posts.

As shown in FIG. 3C, the communications manager 104 can suggest specialized acronyms for use in a want to buy post within the composition GUI 304 on the touch screen display 302 of the client computing device 300. For example, the communications manager 104 can populate the want to buy post with the post suggestion 322*a* (i.e., "ISO") and the post suggestion 322*c* (i.e., "PU"). In one or more embodiments the post suggestion 322*a* represents the phrase "in search of", while the post suggestion 322*c* represents the phrase "pick up." The communications manager 104 can suggest additional acronyms that have special meaning within the social networking system buying and selling communities.

Also as shown in FIG. 3C, the communications manager 104 can suggest words and phrases that include transactional details. For example, the communications manager 104 can populate the want to buy post with the post suggestion 322*b* (i.e., "spend $50"), the post suggestion 322*d* (i.e., "within 10 miles of downtown"), and the post suggestion 322*e* (i.e., "Private message me with offers."). In one or more embodiments, the communications manager 104 suggests transactional details as with post suggestions 322*b*, 322*d*, and 322*e* in order to provide the most relevant information that a potential seller of a particular item would want to know such as an offered price, pickup details, contact details, etc.

Further shown in FIG. 3C, the communications manager 104 can offer additional multimedia to include in the want to buy post. For example, the communications manager 104 can populate the want to buy post with the post suggestion 322*f* (i.e., a digital photograph of a bike). In one or more embodiments, the communications manager 104 can suggest the inclusion of multimedia that will help bring the want to buy post to the attention of potential sellers. In an additional or alternative embodiment, the communications manager 104 can offer a selection of multimedia choices from which the post author can choose a subset for inclusion in the want to buy post.

As mentioned above, the post author can specify intended recipients of the want to buy post via the recipient control 306. In at least one embodiment, and as shown in FIG. 3C, the communications manager 104 can identify and suggest additional recipients (i.e., "Neighborhood Garage Sale") via the recipient control 306. For example, in response to determining that the want to buy post author wishes to purchase a mountain bike, the communications manager 104 can identify one or more social networking system users and/or social networking groups related to mountain bikes. For instance, the communications manager 104 may identify social networking system users who are associated with social networking system activities that indicate they buy or sell mountain bikes. Similarly, the communications manager 104 may identify social networking system groups including social networking system activities that indicate group members buy or sell mountain bikes.

In additional or alternative embodiments, in response to the post author confirming that the post displayed in the composition control 310 is indeed a want to buy post (e.g., as in FIG. 3B), the communications manager 104 can generate a standardized want to buy post with fields that the user may edit. For example, with reference to FIG. 3C, the communications manager 104 may include one or more field for text (not shown), and a field for media (not shown). In one or more embodiments, by clicking or tapping within the field for text, the user may edit the text displayed within. Similarly, by clicking or tapping within the field for media, the user may delete the post suggestion 322*f* (i.e., the digital photograph of the bike), or add additional media. In additional or alternative embodiments, the communications manager 104 may enable additional controls in association to the fields to allow the user to add stylistic elements to the want to buy post (e.g., fonts, font sizes, font color, media edits, etc.). Later, when the communications manager 104 includes the want to buy post in a newsfeed or other social networking system location, the information within the fields can be utilized as structured data, thus ensuring that the content and formatting of the want to buy post remains the same regardless of where the communications manager 104 eventually displays the want to buy post.

Figure 4B:
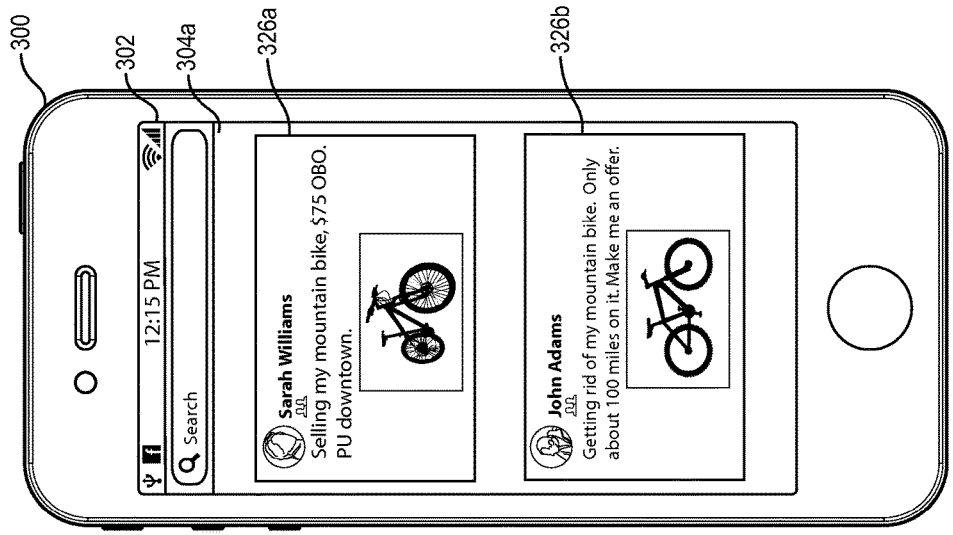
FIG. 4A-4B illustrate a series of user interfaces in accordance with one or more embodiments.
Figure 4A:
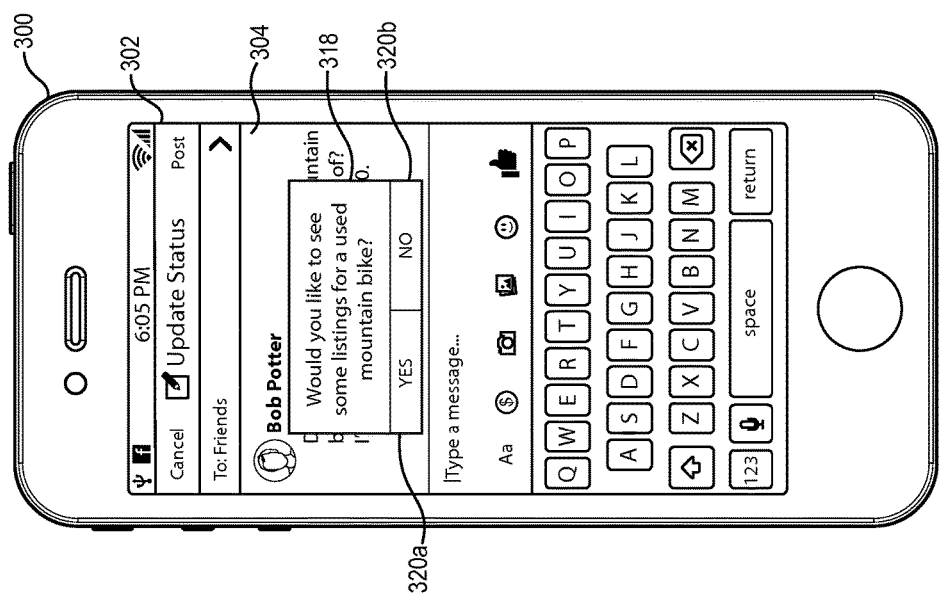

In at least one embodiment, in addition to helping the want to buy post author to create a standardized want to buy post, the communications manager 104 can also identify one or more related sale listings and suggest those sale listings to the post author. For example, as shown in FIG. 4A, the communications manager 104 can identify the particular item the post author would like to buy and prompt the post author to confirm the particular item via the confirmation pop-up window 318. In one or more embodiments, the communications manager 104 can identify the particular item by analyzing the want to buy post for a brand name, a product name, or a description. Additionally, the communications manager 104 can further identify the particular item based on the post author's social networking system activities (e.g., searches, page views, comments, etc.).

In at least one embodiment, the communications manager 104 can identify one or more sale listings that are related to the want to buy post by analyzing sale listings within social networking system groups and personal newsfeeds of social networking system users. For example, as mentioned above, certain social networking system groups may be dedicated to the sale and purchase of particular types of items. Accordingly, the communications manager 104 can first identify a group that is related to the particular item featured in the want to buy post, and then identify sale listings within the group that are directed to the particular item. Similarly, the communications manager 104 can identify sale listings within social networking system users that are directed to the particular item. In one or more embodiments, the communications manager 104 can utilize natural language processing, text comparison, and other analysis techniques to identify the one or more sale listings. Additionally, in at least one embodiment, the communications manager 104 may identify sale listings only within the newsfeeds of friends of the post author and/or within groups in which the post author is a member. The communications manager 104 can identify sale listings while the post author is composing the want to buy post, or immediately following the submission of the want to buy post to the social networking system 102.

In response to the post author's affirmative response to the confirmation pop-up window 318 via the yes/no control 320*a*, the communications manager 104 can provide a display of the one or more identified sale listings. For example, as shown in FIG. 4B, the communications manager 104 can provide the sale listing GUI 304*a* within the touch screen display 302 of the client computing device 300. In one or more embodiments, the communications manager 104 can populate the sale listing GUI 304*a* with one or more sale listings 326*a*, 326*b*. In response to a detected user interaction with one of the sale listings 326*a*, 326*b*, the communications manager 104 can provide further information related to the selected sale listing.

FIGS. 1-4B, the corresponding text, and the examples, provide a number of different methods, systems, and devices for managing commerce-related communications within a social networking system. In addition to the foregoing, embodiments can also be described in terms of flowcharts comprising acts and steps in a method for accomplishing a particular result. For example, FIG. 5 may be performed with less or more steps/acts or the steps/acts may be performed in differing orders. Additionally, the steps/acts described herein may be repeated or performed in parallel with one another or in parallel with different instances of the same or similar steps/acts.

Figure 5:
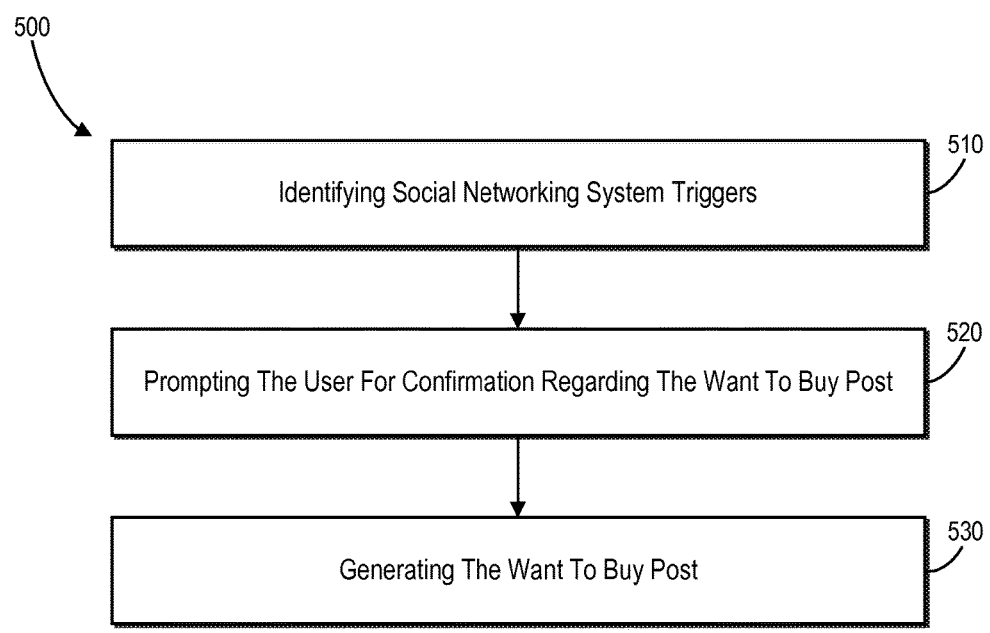
FIG. 5 illustrates a flowchart of a series of acts in a method of managing commerce-related communications in a social networking system in accordance with one or more embodiments.

FIG. 5 illustrates a flowchart of one example method 500 of managing commerce-related communications within a social networking system. The method 500 includes an act 510 of identifying social networking system triggers. In particular, the act 510 can involve identifying one or more social networking system triggers, wherein the one or more social networking system triggers indicate a user's desire to buy a particular item via a social networking system.

For example, in one or more embodiments, identifying one or more social networking system triggers includes one or more of identifying the user's social networking system activity, and identifying one or more features of a social networking system post composed by the user. In at least one embodiment, identifying the user's social networking system activity includes identifying one or more of the user's social networking system search terms, one or more of the user's social networking system search results, one or more of the user's social networking system page views, and one or more of the user's social networking system comments. Similarly, in at least one embodiment, identifying one or more features of a social networking system post composed by the user includes identifying one or more of brand names included in the social networking system post, product names included in the social networking system post, acronyms included in the social networking system post, multimedia featuring a particular item in the social networking system post, keywords indicating interest in a particular item in the social networking system post, and transactional details in the social networking system post.

Furthermore, the method 500 includes an act 520 of prompting the user for confirmation regarding the want to buy post. In particular, the act 520 can involve prompting, based on the identified one or more social networking system triggers, the user for confirmation that the user is composing a want to buy post. In at least one embodiment, prompting the user for confirmation that the user is composing a want to buy post further comprises prompting the user for confirmation of transactional details related to the want to buy post.

Additionally, the method 500 includes an act 530 of generating the want to buy post. In particular, the act 530 can involve generating, based on the user's provided information, a want to buy post, wherein the want to buy post advertises the user's desire to buy the particular item. In one or more embodiments, generating the want to buy post includes generating the want to buy post with standardized formatting suggestions, multimedia suggestions, language suggestions, and keyword suggestions.

The method 500 can also include acts of identifying one or more social networking system for-sale groups including sale listings related to the particular item, and prompting the user to submit the want to buy post to the identified one or more social networking system for-sale groups. Additionally or alternatively, the method 500 can include acts of identifying one or more sale listings corresponding to the particular item, and providing the identified one or more sale listings to the user. In one or more embodiments, identifying one or more sale listings includes searching one or more social networking system for-sale groups and one or more personal newsfeeds.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
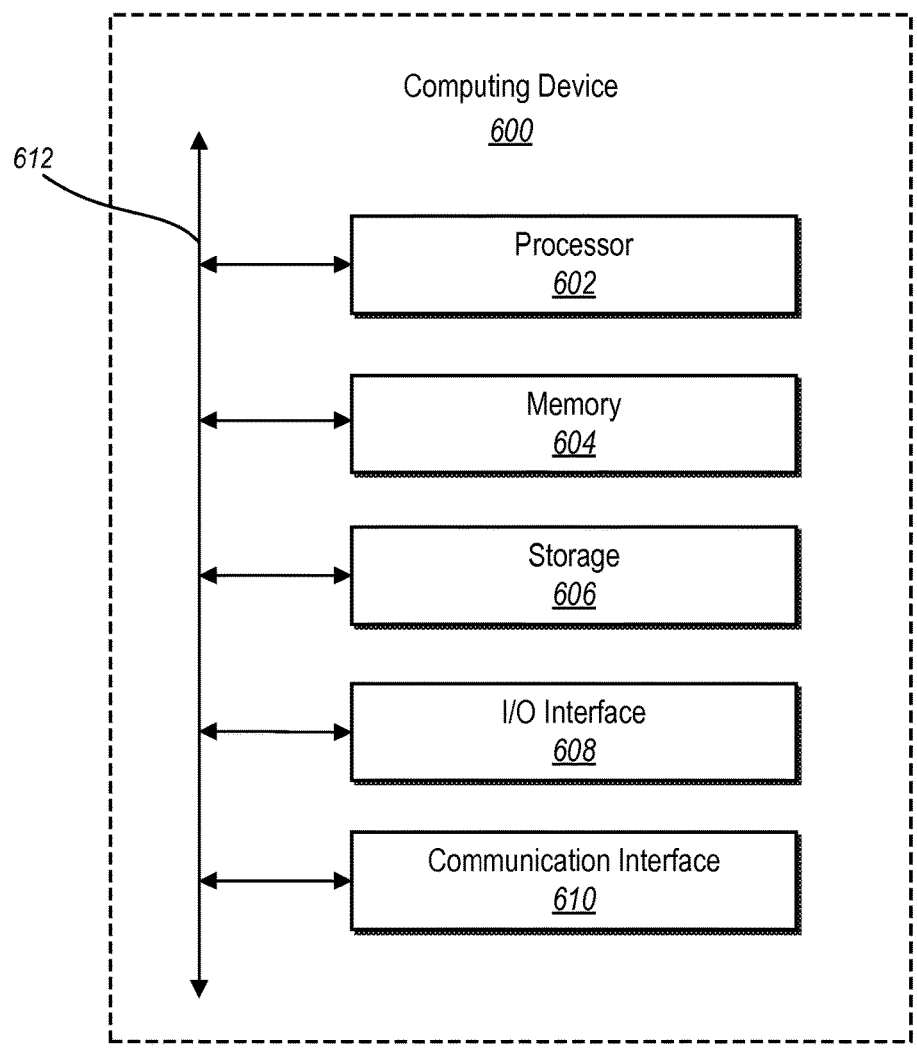
FIG. 6 illustrates a block diagram of an exemplary computing device in accordance with one or more embodiments.

FIG. 6 illustrates a block diagram of exemplary computing device 600 that may be configured to perform one or more of the processes described above. One will appreciate that one or more computing devices such as the computing device 600 may implement the system 100. As shown by FIG. 6, the computing device 600 can comprise a processor 602, a memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In one or more embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In one or more embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In one or more embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN—a wireless technology standard for exchanging data over short distances), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 7:
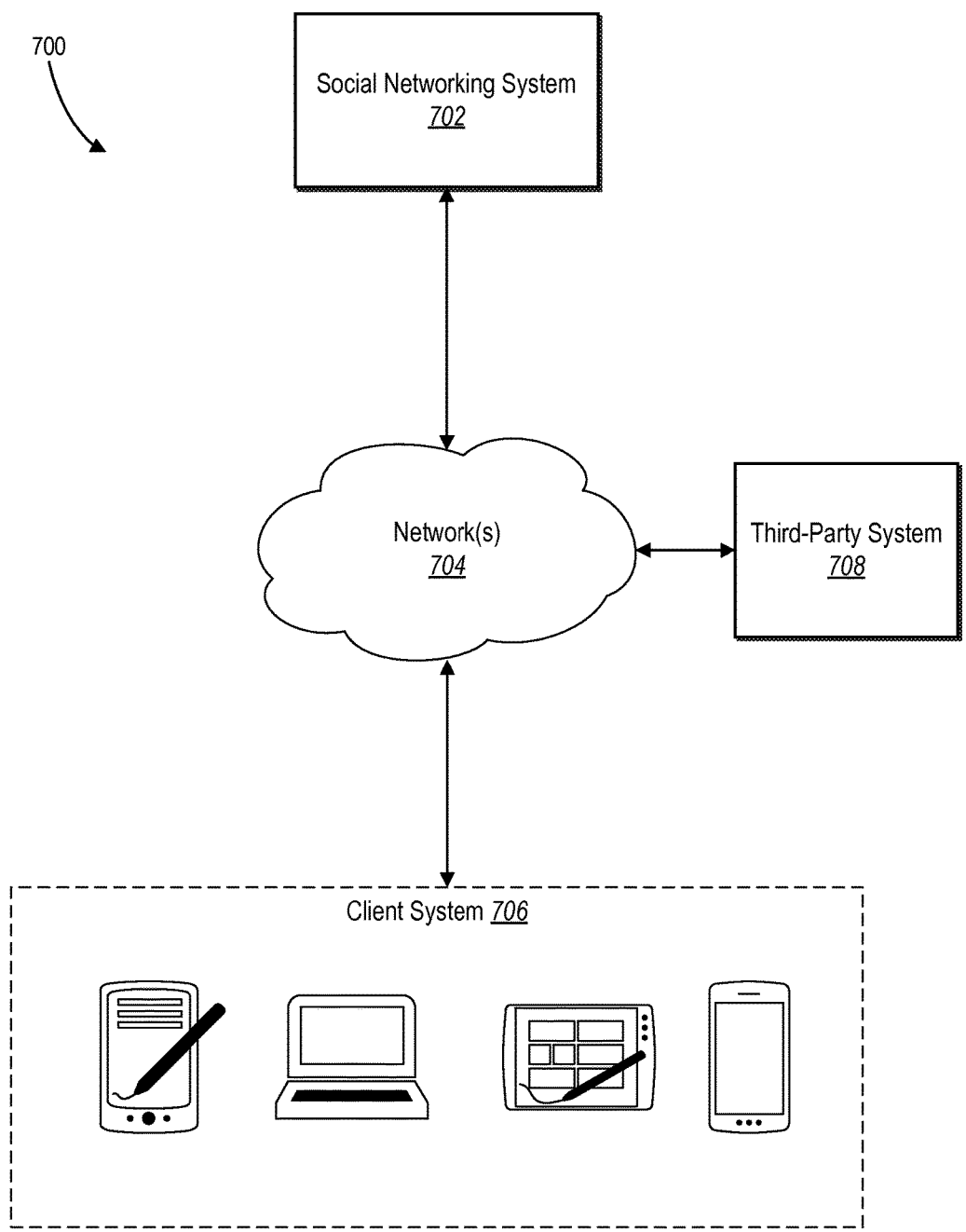
FIG. 7 is an example network environment of a social networking system in accordance with one or more embodiments.

FIG. 7 illustrates an example network environment 700 of a social networking system. Network environment 700 includes a client system 706, a social networking system 702, and a third-party system 708 connected to each other by a network 704. Although FIG. 7 illustrates a particular arrangement of client system 706, social networking system 702, third-party system 708, and network 704, this disclosure contemplates any suitable arrangement of client system 706, social networking system 702, third-party system 708, and network 704. As an example and not by way of limitation, two or more of client system 706, social networking system 702, and third-party system 708 may be connected to each other directly, bypassing network 704. As another example, two or more of client system 706, social networking system 702, and third-party system 708 may be physically or logically co-located with each other in whole or in part. Moreover, although FIG. 7 illustrates a particular number of client systems 706, social networking systems 702, third-party systems 708, and networks 704, this disclosure contemplates any suitable number of client systems 706, social networking systems 702, third-party systems 708, and networks 704. As an example and not by way of limitation, network environment 700 may include multiple client system 706, social networking systems 702, third-party systems 708, and networks 704.

This disclosure contemplates any suitable network 704. As an example and not by way of limitation, one or more portions of network 704 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 704 may include one or more networks 704.

Links may connect client system 706, social networking system 702, and third-party system 708 to communication network 704 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client system 706 may be an electronic device including hardware, software, or embedded logic components or a combination of two or more such components and capable of carrying out the appropriate functionalities implemented or supported by client system 706. As an example and not by way of limitation, a client system 706 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 706. A client system 706 may enable a network user at client system 706 to access network 704. A client system 706 may enable its user to communicate with other users at other client systems 706.

In particular embodiments, client system 706 may include a web browser (e.g., examples of web browsers can include MICROSOFT INTERNET EXPLORER, GOOGLE CHROME or MOZILLA FIREFOX), and may have one or more add-ons, plug-ins, or other extensions (e.g., examples of add-ons, plug-ins, or other extensions can include TOOLBAR or YAHOO TOOLBAR). A user at client system 706 may enter a Uniform Resource Locator (URL) or other address directing the web browser to a particular server (such as server, or a server associated with a third-party system 708), and the web browser may generate a Hyper Text Transfer Protocol (HTTP) request and communicate the HTTP request to server. The server may accept the HTTP request and communicate to client system 706 one or more Hyper Text Markup Language (HTML) files responsive to the HTTP request. Client system 706 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in various scripting languages (e.g., examples of scripting languages can include JAVASCRIPT, JAVA, MICROSOFT SILVERLIGHT, combinations of markup language and scripts such as AJAX (Asynchronous JAVASCRIPT and XML)), and the like. Herein, reference to a webpage encompasses one or more corresponding webpage files (which a browser may use to render the webpage) and vice versa, where appropriate.

In particular embodiments, social networking system 702 may be a network-addressable computing system that can host an online social network. Social networking system 702 may generate, store, receive, and send social-networking data, such as, for example, user-profile data, concept-profile data, social-graph information, or other suitable data related to the online social network. Social networking system 702 may be accessed by the other components of network environment 700 either directly or via network 704. In particular embodiments, social networking system 702 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 702 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 706, a social-networking system 702, or a third-party system 708 to manage, retrieve, modify, add, or delete, the information stored in data store.

In particular embodiments, social networking system 702 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 702 may provide users of the online social network the ability to communicate and interact with other users. In particular embodiments, users may join the online social network via social networking system 702 and then add connections (e.g., relationships) to a number of other users of social networking system 702 whom they want to be connected to. Herein, the term "friend" may refer to any other user of social networking system 702 with whom a user has formed a connection, association, or relationship via social networking system 702.

In particular embodiments, social networking system 702 may provide users with the ability to take actions on various types of items or objects, supported by social networking system 702. As an example and not by way of limitation, the items and objects may include groups or social networks to which users of social networking system 702 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 702 or by an external system of third-party system 708, which is separate from social networking system 702 and coupled to social networking system 702 via a network 704.

In particular embodiments, social networking system 702 may be capable of linking a variety of entities. As an example and not by way of limitation, social networking system 702 may enable users to interact with each other as well as receive content from third-party systems 708 or other entities, or to allow users to interact with these entities through an application programming interfaces (API) or other communication channels.

In particular embodiments, a third-party system 708 may include one or more types of servers, one or more data stores, one or more interfaces, including but not limited to APIs, one or more web services, one or more content sources, one or more networks, or any other suitable components, e.g., that servers may communicate with. A third-party system 708 may be operated by a different entity from an entity operating social networking system 702. In particular embodiments, however, social networking system 702 and third-party systems 708 may operate in conjunction with each other to provide social-networking services to users of social networking system 702 or third-party systems 708. In this sense, social networking system 702 may provide a platform, or backbone, which other systems, such as third-party systems 708, may use to provide social-networking services and functionality to users across the Internet.

In particular embodiments, a third-party system 708 may include a third-party content object provider. A third-party content object provider may include one or more sources of content objects, which may be communicated to a client system 706. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 702 also includes user-generated content objects, which may enhance a user's interactions with social networking system 702. User-generated content may include anything a user can add, upload, send, or "post" to social networking system 702. As an example and not by way of limitation, a user communicates posts to social networking system 702 from a client system 706. Posts may include data such as status updates or other textual data, location information, photos, videos, links, music or other similar data or media. Content may also be added to social networking system 702 by a third-party through a "communication channel," such as a newsfeed or stream.

In particular embodiments, social networking system 702 may include a variety of servers, sub-systems, programs, modules, logs, and data stores. In particular embodiments, social networking system 702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 702 may also include suitable components such as network interfaces, security mechanisms, load balancers, failover servers, management-and-network-operations consoles, other suitable components, or any suitable combination thereof. In particular embodiments, social networking system 702 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 702 to one or more client systems 706 or one or more third-party system 708 via network 704. The web server may include a mail server or other messaging functionality for receiving and routing messages between social networking system 702 and one or more client systems 706. An API-request server may allow a third-party system 708 to access information from social networking system 702 by calling one or more APIs. An action logger may be used to receive communications from a web server about a user's actions on or off social networking system 702. In conjunction with the action log, a third-party-content-object log may be maintained of user exposures to third-party-content objects. A notification controller may provide information regarding content objects to a client system 706. Information may be pushed to a client system 706 as notifications, or information may be pulled from client system 706 responsive to a request received from client system 706. Authorization servers may be used to enforce one or more privacy settings of the users of social networking system 702. A privacy setting of a user determines how particular information associated with a user can be shared. The authorization server may allow users to opt in to or opt out of having their actions logged by social networking system 702 or shared with other systems (e.g., third-party system 708), such as, for example, by setting appropriate privacy settings. Third-party-content-object stores may be used to store content objects received from third parties, such as a third-party system 708. Location stores may be used for storing location information received from client systems 706 associated with users. Advertisement-pricing modules may combine social information, the current time, location information, or other suitable information to provide relevant advertisements, in the form of notifications, to a user.

Figure 8:
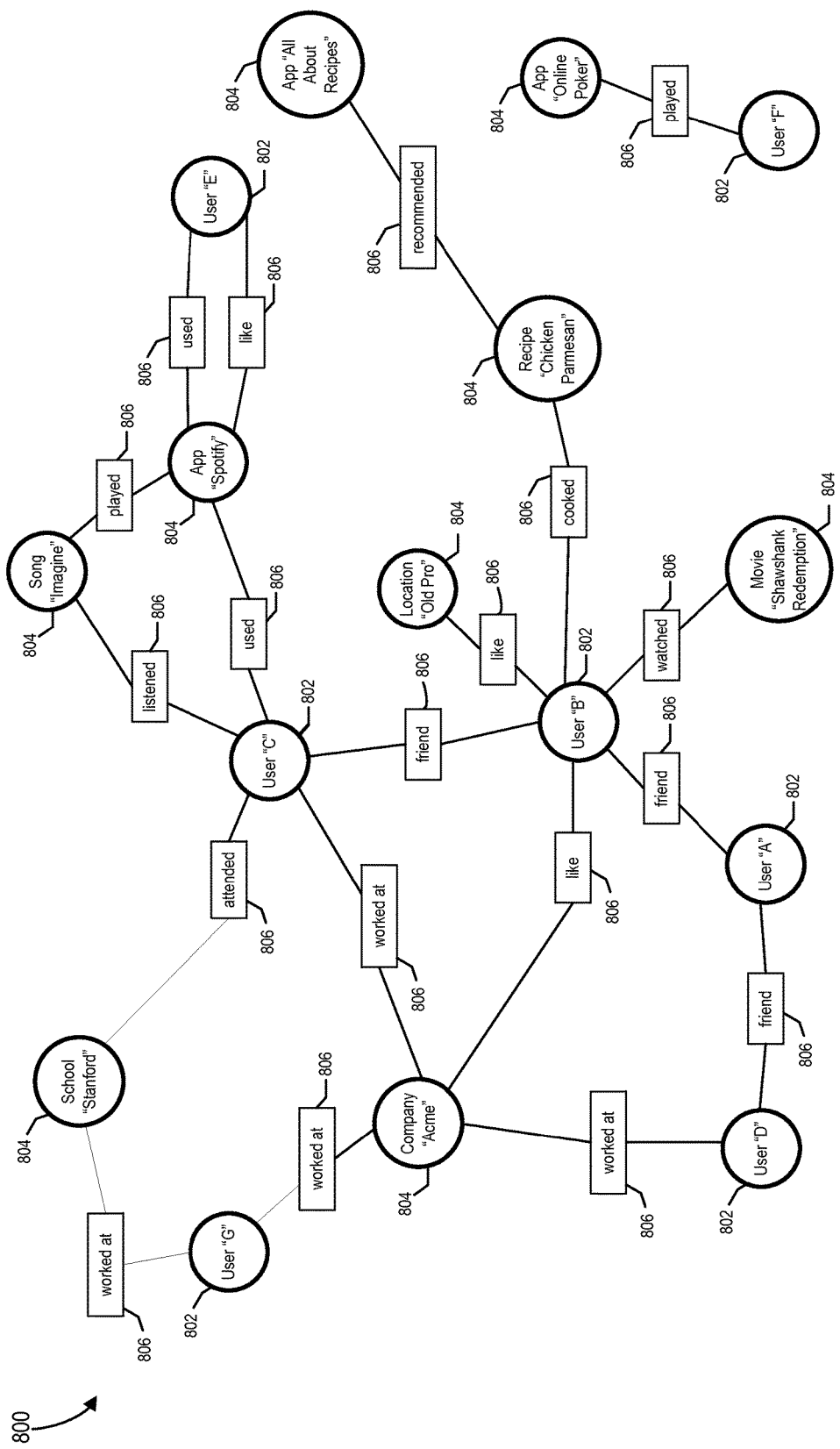
FIG. 8 illustrates a social graph in accordance with one or more embodiments.

FIG. 8 illustrates example social graph 800. In particular embodiments, social networking system 702 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a social networking system 702, client system 706, or third-party system 708 may access social graph 800 and related social-graph information for suitable applications. The nodes and edges of social graph 800 may be stored as data objects, for example, in a data store (such as a social-graph database). Such a data store may include one or more searchable or query able indexes of nodes or edges of social graph 800.

In particular embodiments, a user node 802 may correspond to a user of social networking system 702. As an example and not by way of limitation, a user may be an individual (human user), an entity (e.g., an enterprise, business, or third-party application), or a group (e.g., of individuals or entities) that interacts or communicates with or over social networking system 702. In particular embodiments, when a user registers for an account with social networking system 702, social networking system 702 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with social networking system 702. In particular embodiments, a user node 802 may be associated with information provided by a user or information gathered by various systems, including social networking system 702. As an example and not by way of limitation, a user may provide his or her name, profile picture, contact information, birth date, sex, marital status, family status, employment, education background, preferences, interests, or other demographic information. In particular embodiments, a user node 802 may be associated with one or more data objects corresponding to information associated with a user. In particular embodiments, a user node 802 may correspond to one or more webpages.

In particular embodiments, a concept node 804 may correspond to a concept. As an example and not by way of limitation, a concept may correspond to a place (such as, for example, a movie theater, restaurant, landmark, or city); a website (such as, for example, a website associated with social-network system 802 or a third-party website associated with a web-application server); an entity (such as, for example, a person, business, group, sports team, or celebrity); a resource (such as, for example, an audio file, video file, digital photo, text file, structured document, or application) which may be located within social networking system 702 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including social networking system 702. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to social networking system 702. Profile pages may also be hosted on third-party websites associated with a third-party server 908. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept node 804.

In particular embodiments, a concept node 804 may represent a third-party webpage or resource hosted by a third-party system 708. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 706 to send to social networking system 702 a message indicating the user's action. In response to the message, social networking system 702 may create an edge (e.g., an "eat" edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, social networking system 702 may send a "friend request" to the second user. If the second user confirms the "friend request," social networking system 702 may create an edge 806 connecting the first user's user node 802 to the second user's user node 802 in social graph 800 and store edge 806 as social-graph information in one or more of data stores. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to a edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, social networking system 702 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 702 may create a "listened" edge 806 and a "used" edge (as illustrated in FIG. 8) between user nodes 802 corresponding to the user and concept nodes 804 corresponding to the song and application to indicate that the user listened to the song and used the application. Moreover, social networking system 702 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, social networking system 702 may create an edge 806 between a user node 802 and a concept node 804 in social graph 800. As an example and not by way of limitation, a user viewing a concept-profile page (such as, for example, by using a web browser or a special-purpose application hosted by the user's client system 706) may indicate that he or she likes the concept represented by the concept node 804 by clicking or selecting a "Like" icon, which may cause the user's client system 706 to send to social networking system 702 a message indicating the user's liking of the concept associated with the concept-profile page. In response to the message, social networking system 702 may create an edge 806 between user node 802 associated with the user and concept node 804, as illustrated by "like" edge 806 between the user and concept node 804.

In particular embodiments, social networking system 702 may store an edge 806 in one or more data stores. In particular embodiments, an edge 806 may be automatically formed by social networking system 702 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a newsfeed or ticker item on social networking system 702). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within newsfeeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 702 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 702) or RSVP (e.g., through social networking system 702) to an event associated with the advertisement. In addition or as an alternative, an advertisement may include social-networking-system context directed to the user. As an example and not by way of limitation, an advertisement may display information about a friend of the user within social networking system 702 who has taken an action associated with the subject matter of the advertisement.

In particular embodiments, social networking system 702 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 702 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 702 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 702 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 702 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 702 may calculate a coefficient based on a user's actions. Social networking system 702 may monitor such actions on the online social network, on a third-party system 708, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 702 may calculate a coefficient based on the user's actions with particular types of content. The content may be associated with the online social network, a third-party system 708, or another suitable system. The content may include users, profile pages, posts, news stories, headlines, instant messages, chat room conversations, emails, advertisements, pictures, video, music, other suitable objects, or any combination thereof. Social networking system 702 may analyze a user's actions to determine whether one or more of the actions indicate an affinity for subject matter, content, other users, and so forth. As an example and not by way of limitation, if a user may make frequently posts content related to "coffee" or variants thereof, social networking system 702 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 702 may calculate a coefficient based on the type of relationship between particular objects. Referencing the social graph 800, social networking system 702 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than a user nodes 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 702 may determine that the user has a higher coefficient with respect to the first photo than the second photo because having a tagged-in-type relationship with content may be assigned a higher weight and/or rating than having a like-type relationship with content. In particular embodiments, social networking system 702 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 702 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, social networking system 702 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 706 of the user). A first user may be more interested in other users or concepts that are closer to the first user. As an example and not by way of limitation, if a user is one mile from an airport and two miles from a gas station, social networking system 702 may determine that the user has a higher coefficient for the airport than the gas station based on the proximity of the airport to the user.

In particular embodiments, social networking system 702 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 702 may provide information that is relevant to user's interests and current circumstances, increasing the likelihood that they will find such information of interest. In particular embodiments, social networking system 702 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 702 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 702 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 708 (e.g., via an API or other communication channel), or from another suitable system. In response to the request, social networking system 702 may calculate the coefficient (or access the coefficient information if it has previously been calculated and stored). In particular embodiments, social networking system 702 may measure an affinity with respect to a particular process. Different processes (both internal and external to the online social network) may request a coefficient for a particular object or set of objects. Social networking system 702 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 804 corresponding to a particular photo may have a privacy setting specifying that the photo may only be accessed by users tagged in the photo and their friends. In particular embodiments, privacy settings may allow users to opt in or opt out of having their actions logged by social networking system 702 or shared with other systems (e.g., third-party system 708). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 808, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 702 may send a request to the data store for the object. The request may identify the user associated with the request and may only be sent to the user (or a client system 706 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   identifying, using one or more processors and in response to a user-composed social networking system post from a user of a social networking system, one or more triggers indicating that the user-composed social networking system post is a want to buy post identifying an item that the user is interested in purchasing and comprising a solicitation for other users of the social networking system who are interested in selling the item or have information associated with the item;
   determining, using the one or more processors and based on the identified one or more triggers, whether the user-composed social networking system post is a want to buy post;
   in response to a determination that the user-composed social networking system post is a want to buy post, generating a pre-formatted want to buy post with data based on information associated with the one or more triggers, the structured data corresponding to data associated with one or more sale listings; and
   in response to a determination that the user-composed social networking system post is not a want to buy post, posting the user-composed social networking system post as a standard social networking system post.

2. The method as recited in claim 1, wherein identifying one or more triggers comprises one or more of identifying the user's social networking system activity, or identifying one or more features of the user-composed social networking system post.

3. The method as recited in claim 2, wherein identifying the user's social networking system activity comprises identifying at least one of the user's social networking system search terms, the user's social networking system search results, the user's social networking system page views, or the user's social networking system comments.

4. The method as recited in claim 2, wherein identifying one or more features of the user-composed social networking system post comprises identifying one or more of brand names included in the user-composed social networking system post, product names included in the user-composed social networking system post, acronyms included in the user-composed social networking system post, multimedia featuring a particular item in the user-composed social networking system post, keywords indicating interest in a particular item in the user-composed social networking system post, or transactional details in the user-composed social networking system post.

5. The method as recited in claim 1, further comprising, in response to the determination that the user-composed social networking system post is a want to buy post and prior to generating the pre-formatted want to buy post, prompting the user for confirmation that the user wants to convert the user-composed social networking system post into a pre-formatted want to buy post by prompting the user for confirmation of transactional details to include in the pre-formatted want to buy post.

6. The method as recited in claim 1, wherein generating the pre-formatted want to buy post with structured data based on information associated with the one or more triggers comprises generating the pre-formatted want to buy post with standardized formatting suggestions associated with the one or more sale listings, multimedia suggestions associated with the one or more sale listings, language suggestions associated with the one or more sale listings, and keyword suggestions associated with the one or more sale listings.

7. The method as recited in claim 1, further comprising:
   identifying one or more social networking system for-sale groups including active sale listings related to the item that the user is interested in purchasing; and
   optimizing the generated pre-formatted want to buy post for one or more for-sale groups within the social networking system by prompting the user to submit the generated pre-formatted want to buy post to the identified one or more social networking system for-sale groups.

8. The method as recited in claim 1, further comprising:
   identifying one or more active sale listings corresponding to the item that the user is interested in purchasing; and
   providing the identified one or more active sale listings to the user.

9. The method as recited in claim 1, wherein the structured data corresponding to the data associated with the one or more sale listings comprises one or more fields corresponding to the one or more sale listings.

10. A system comprising:
    at least one processor; and
    at least one non-transitory computer-readable storage medium storing instructions thereon that, when executed by the at least one processor, cause the system to:
      identify, in response to a user-composed social networking system post from a user of a social networking system, one or more triggers indicating that the user-composed social networking system post is a want to buy post identifying an item that the user is interested in purchasing and comprising a solicitation for other users of the social networking system who are interested in selling the item or have information associated with the item;
      determine, using the one or more processors and based on the identified one or more triggers, whether the user-composed social networking system post is a want to buy post;

in response to a determination that the user-composed social networking system post is a want to buy post, generate a pre-formatted want to buy post with structured data based on information associated with the one or more triggers, the structured data corresponding to data associated with one or more sale listings; and in response to a determination that the user-composed social networking system post is not a want to buy post, post the user-composed social networking post as a standard social networking system post.

11. The system as recited in claim 10, wherein identifying one or more triggers comprises one or more of identifying the user's social networking system activity, or identifying one or more features of the user-composed social networking system post.

12. The system as recited in claim 11, wherein identifying the user's social networking system activity comprises identifying one or more of the user's social networking system search terms, one or more of the user's social networking system search results, one or more of the user's social networking system page views, and one or more of the user's social networking system comments.

13. The system as recited in claim 12, wherein identifying one or more features of the user-composed social networking system post comprises identifying one or more of brand names included in the social networking system post, product names included in the social networking system post, acronyms included in the social networking system post, multimedia featuring a particular item in the social networking system post, keywords indicating interest in a particular item in the social networking system post, or transactional details in the social networking system post.

14. The system as recited in claim 13, further storing instructions that, when executed by the at least one processor, cause the system to prompt, in response to the determination that the user-composed social networking system post is a want to buy post and prior to generating the pre-formatted want to buy post, the user for confirmation that the user wants to convert the user-composed social networking system post into a pre-formatted want to buy post by prompting the user for confirmation of transactional details to include in the pre-formatted want to buy post.

15. The system as recited in claim 14, wherein generating the pre-formatted want to buy post with structured data based on information associated with the one or more triggers comprises generating the pre-formatted want to buy post with standardized formatting suggestions associated with the one or more sale listings, multimedia suggestions associated with the one or more sale listings, language suggestions associated with the one or more sale listings, and keyword suggestions associated with the one or more sale listings.

16. The system as recited in claim 15, further comprising instructions that, when executed by the at least one processor, cause the system to:

identify one or more social networking system for-sale groups including active sale listings related to the particular item; and optimize the generated pre-formatted want to buy post for one or more for-sale groups within the social networking system by prompting the user to submit the generated pre-formatted want to buy post to the identified one or more social networking system for-sale groups.

17. The system as recited in claim 16, further comprising instructions that, when executed by the at least one processor, cause the system to:

identify one or more active sale listings corresponding to the item; and provide the identified one or more active sale listings to the user.

18. The system as recited in claim 17, wherein identifying the one or more active sale listings comprises searching one or more social networking system for-sale groups and one or more personal newsfeeds.

19. A non-transitory computer readable medium storing instructions thereon that, when executed by at least one processor, cause the at least one processor to:

identify, in response to a user-composed social networking system post from a user of a social networking system, one or more triggers indicating that the user-composed social networking system post is a want to buy post identifying an item that the user is interested in purchasing and comprising a solicitation for other users of the social networking system who are interested in selling the item or have information associated with the item;

determine, based on the identified one or more triggers, whether the user-composed social networking system post is a want to buy post;

in response to a determination that the user-composed social networking system post is a want to buy post, generate a pre-formatted want to buy post with structured data based on information associated with the one or more triggers, the structured data corresponding to data associated with one or more sale listings; and in response to a determination that the user-composed social networking system post is not a want to buy post, post the user-composed social networking post as a standard social networking system post.

20. The non-transitory computer readable medium as recited in claim 19, further storing instruction thereon that, when executed by the at least one processor, cause the at least one processor to:

identify one or more active sale listings corresponding to the item that the user is interested in purchasing, wherein identifying the one or more active sale listings comprises searching one or more social networking system for-sale groups and one or more personal newsfeeds; and provide the identified one or more active sale listings to the user.

* * * * *